United States Patent
Narayana Gowda et al.

(10) Patent No.: US 11,556,430 B2
(45) Date of Patent: Jan. 17, 2023

(54) SELECTING RESTORE PROCESSES FOR APPLICATIONS HOSTED ON STORAGE VOLUMES THAT ARE PART OF GROUP REPLICATION SESSIONS

(71) Applicant: EMC IP Holding Company LLC, Hopkinton, MA (US)

(72) Inventors: Shivasharan Dalasanur Narayana Gowda, Kolar (IN); Sunil Kumar, Bangalore (IN); Prashant Pokharna, Ajmer (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/173,856

(22) Filed: Feb. 11, 2021

(65) Prior Publication Data
US 2022/0253362 A1  Aug. 11, 2022

(51) Int. Cl.
*G06F 11/14* (2006.01)
*G06F 11/20* (2006.01)
*G06F 3/06* (2006.01)

(52) U.S. Cl.
CPC ........ *G06F 11/1469* (2013.01); *G06F 3/0604* (2013.01); *G06F 3/065* (2013.01); *G06F 3/067* (2013.01); *G06F 3/0644* (2013.01); *G06F 11/1451* (2013.01); *G06F 11/2023* (2013.01)

(58) Field of Classification Search
CPC .. G06F 11/1469; G06F 3/0604; G06F 3/0644; G06F 3/065; G06F 3/067; G06F 11/1451; G06F 11/2023
See application file for complete search history.

(56) References Cited

U.S. PATENT DOCUMENTS

| | | | | |
|---|---|---|---|---|
| 7,359,927 B1* | 4/2008 | Cardente | ............ | G06F 11/1451 |
| 2011/0078494 A1* | 3/2011 | Maki | ................ | G06F 11/2071 |
| | | | | 714/6.12 |
| 2012/0030513 A1* | 2/2012 | Peng | ................ | G06F 11/2097 |
| | | | | 714/37 |

(Continued)

OTHER PUBLICATIONS

Dell Technologies, "Dell EMC PowerFlex: Introduction to Replication," Technical White Paper, Jun. 2020, 34 pages.

(Continued)

*Primary Examiner* — Masud K Khan
(74) *Attorney, Agent, or Firm* — Ryan, Mason & Lewis, LLP

(57) ABSTRACT

An apparatus comprises a processing device configured to receive a request to restore one or more applications, the request specifying one of a set of remote copies of storage volumes that store data of the applications. The processing device is also configured to analyze the applications to identify (i) the storage volumes storing data for the applications and (ii) groups comprising the identified storage volumes. The processing device is also configured, responsive to determining that the identified groups are part of a group replication session, to select one of a set of different types of restore processes for performing the restore of the applications to the specified remote copy based at least in part on whether the identified groups comprise additional storage volumes other than the identified storage volumes and to perform the restore of the applications to the specified remote copy utilizing the selected restore process.

21 Claims, 16 Drawing Sheets

(56) References Cited

U.S. PATENT DOCUMENTS

2015/0234618 A1* 8/2015 Miwa .................... G06F 3/0608
 711/165
2020/0257567 A1* 8/2020 Fontanari Filho .. G06F 9/45558

OTHER PUBLICATIONS

Dell Technologies, "Dell EMC PowerStore: Replication Technologies," Technical White Paper, Jan. 2021, 41 pages.
Dell EMC, "Dell EMC Unity: Replication Technologies," White Paper, Jan. 2021, 80 pages.
Dell Technologies, "AppSync," Data Sheet, 2020, 3 pages.

* cited by examiner

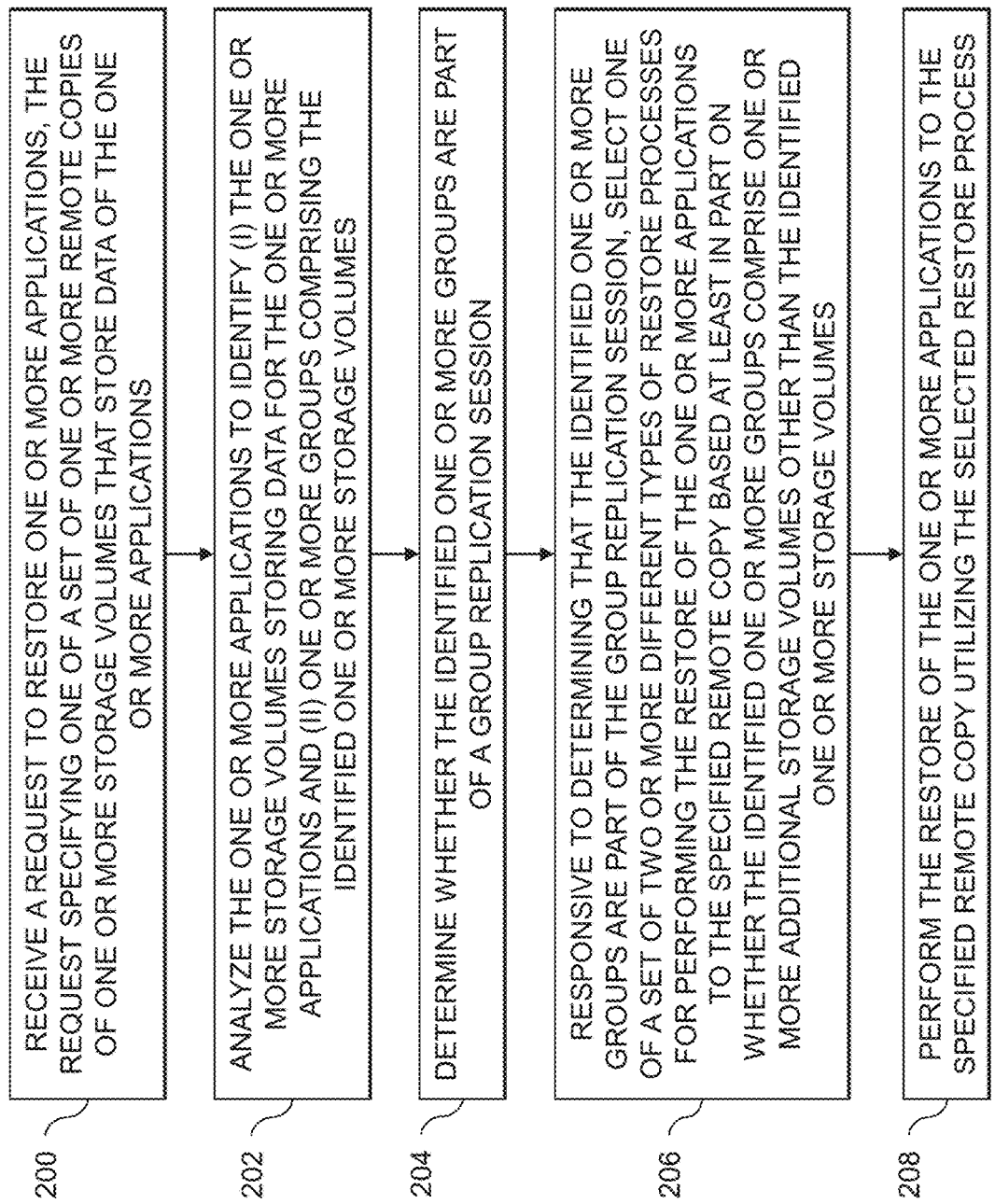

SELECTING RESTORE PROCESSES FOR APPLICATIONS HOSTED ON STORAGE VOLUMES THAT ARE PART OF GROUP REPLICATION SESSIONS

FIELD

The field relates generally to information processing, and more particularly to storage in information processing systems.

BACKGROUND

Application environments may comprise multiple applications that are hosted and spread across storage volumes of one or more groups, such as one or more consistency groups. Such groups may be configured for group replication, where a single replication session is used to replicate the group of storage volumes. Such a replication session may be associated with one or more user-defined protection policies, and the replication session operates the scheduling and replication from source storage volumes to target storage resources in accordance with the user-defined protection policies.

SUMMARY

Illustrative embodiments of the present disclosure provide techniques for selecting restore processes for applications hosted on storage volumes that are part of group replication sessions.

In one embodiment, an apparatus comprises at least one processing device comprising a processor coupled to a memory. The at least one processing device is configured to perform the step of receiving a request to restore one or more applications, the request specifying one of a set of one or more remote copies of one or more storage volumes that store data of the one or more applications. The at least one processing device is also configured to perform the step of analyzing the one or more applications to identify (i) the one or more storage volumes storing data for the one or more applications and (ii) one or more groups comprising the identified one or more storage volumes, and determining whether the identified one or more groups are part of a group replication session. The at least one processing device is further configured to perform the steps of, responsive to determining that the identified one or more groups are part of the group replication session, selecting one of a set of two or more different types of restore processes for performing the restore of the one or more applications to the specified remote copy based at least in part on whether the identified one or more groups comprise one or more additional storage volumes other than the identified one or more storage volumes and performing the restore of the one or more applications to the specified remote copy utilizing the selected restore process.

These and other illustrative embodiments include, without limitation, methods, apparatus, networks, systems and processor-readable storage media.

BRIEF DESCRIPTION OF THE DRAWINGS

FIG. 2 is a flow diagram of an exemplary process for selecting restore processes for applications hosted on storage volumes that are part of group replication sessions in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
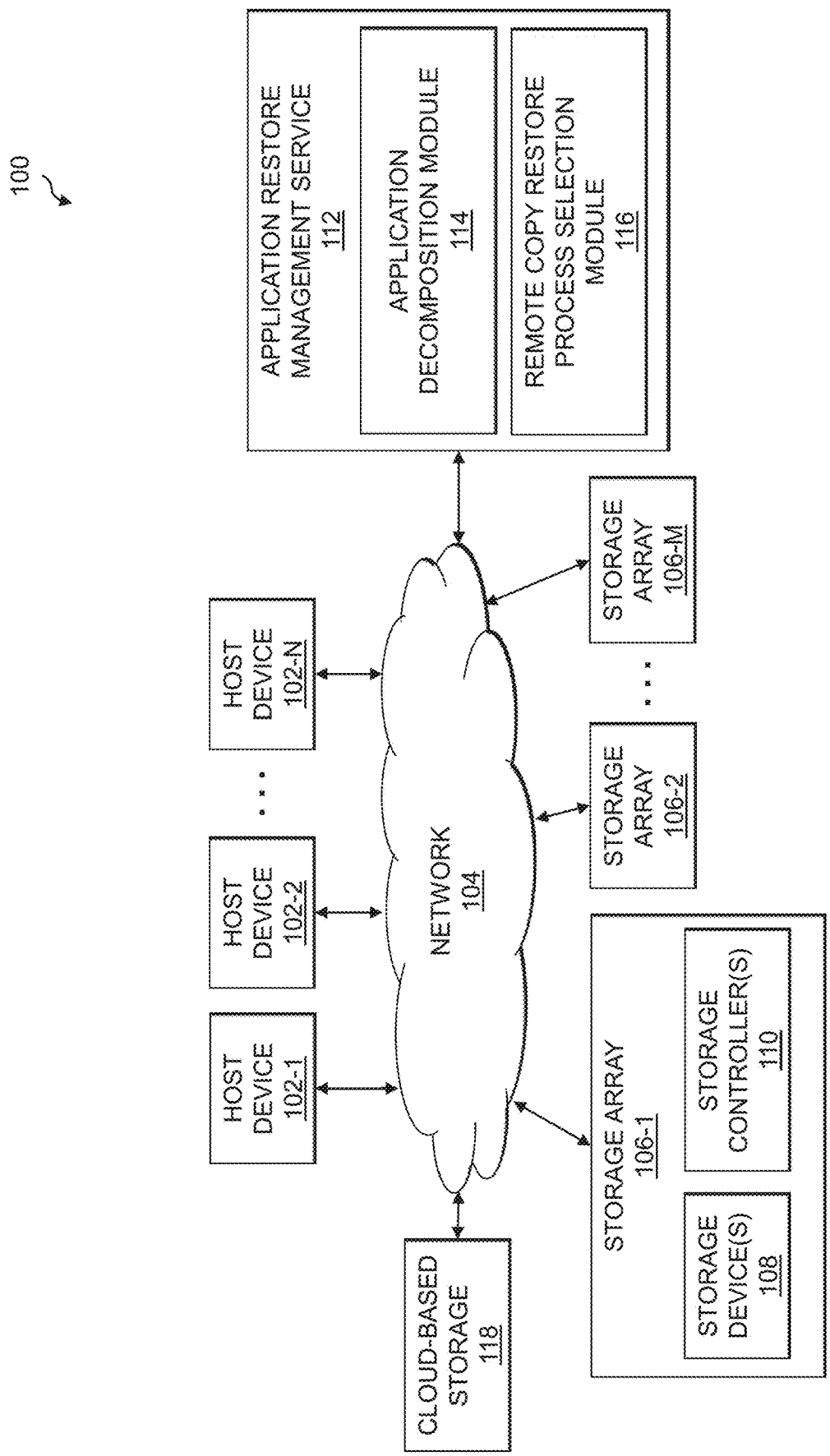
FIG. 1 is a block diagram of an information processing system configured for selecting restore processes for applications hosted on storage volumes that are part of group replication sessions in an illustrative embodiment.

FIG. 1 shows an information processing system 100 configured in accordance with an illustrative embodiment to select restore processes for applications hosted on storage volumes that are part of group replication sessions. The information processing system 100 comprises one or more host devices 102-1, 102-2, . . . 102-N (collectively, host devices 102) that communicate over a network 104 with one or more storage arrays 106-1, 106-2, . . . 106-M (collectively, storage arrays 106). The network 104 may comprise a storage area network (SAN).

The storage array 106-1, as shown in FIG. 1, comprises a plurality of storage devices 108 each storing data utilized by one or more applications running on the host devices 102. The storage devices 108 are illustratively arranged in one or more storage pools. The storage array 106-1 also comprises one or more storage controllers 110 that facilitate IO processing for the storage devices 108. The storage array 106-1 and its associated storage devices 108 are an example of what is more generally referred to herein as a "storage system." This storage system in the present embodiment is shared by the host devices 102, and is therefore also referred to herein as a "shared storage system." In embodiments where there is only a single host device 102, the host device 102 may be configured to have exclusive use of the storage system.

The host devices 102 illustratively comprise respective computers, servers or other types of processing devices capable of communicating with the storage arrays 106 via the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 108 of the storage array 106-1 may implement logical units (LUNs) configured to store objects for users associated with the host devices 102. These objects can comprise files, blocks or other types of objects. The host devices 102 interact with the storage array 106-1 utilizing read and write commands as well as other types of commands that are transmitted over the network 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 106-1 to include different portions of one or more physical storage devices. Storage devices 108 may therefore be viewed as comprising respective LUNs or other logical storage volumes.

In the information processing system 100 of FIG. 1, the host devices 102 are assumed to access one or more storage volumes provided by the storage arrays 106. For example, an application environment may include multiple applications that are hosted and spread across storage volumes of a group (e.g., a volume group, a storage group, a consistency group, a network attached storage (NAS) server, etc.), where such storage volumes of the group may be hosted on one or multiple different ones of the storage arrays 106 and possibly the cloud-based storage 118. A user (e.g., of one of the host devices 102) may configure group replication for the group, where group replication may include or refer to a single replication session replicating the data of a group of storage volumes (e.g., volume groups sessions) or a group of filesystems (e.g., NAS server sessions). When the user seeks to restore one or more applications in the application environment, the choice of the most efficient remote copy restore method or process may depend on the whether the user wants to restore all applications hosted in the storage volume group, a subset of the applications hosted in the storage volume group, etc. The information processing system 100 further includes an application restore management service 112 that is configured to provide functionality for selecting an optimal or most efficient remote copy restore process for restoring production applications using copies from remote sites (e.g., which may comprise one or more of the storage arrays 106, the cloud-based storage 118, etc.).

The application restore management service 112 includes an application decomposition module 114 and a remote copy restore process selection module 116. The application restore management service 112 is configured to receive requests to restore applications, the requests specifying remote copies of storage volumes that store data of the applications to be restored. The application decomposition module 114 is configured to analyze one or more applications that are part of a given request received by the application restore management service 112 to identify (i) one or more storage volumes storing data for the one or more applications and (ii) one or more groups comprising the identified one or more storage volumes. The application decomposition module 114 is also configured to determine whether the identified one or more groups are part of a group replication session. Responsive to determining that the identified one or more groups are part of the group replication session, the remote copy restore process selection module 116 is configured to select one of a set of two or more different types of restore processes for performing the restore of the one or more applications to a specified remote copy based at least in part on whether the identified one or more groups comprise one or more additional storage volumes other than the identified one or more storage volumes. The application restore management service 112 is then configured to perform (or initiate performance by the storage arrays 106) the restore of the one or more applications from the specified remote copy utilizing the selected restore process.

In some embodiments, the application restore management service 112 is utilized by storage administrators or other authorized users (e.g., users operating the host devices 102). The storage administrators or other users can control or initiate restore operations for one or more applications using remote copy operations.

At least portions of the functionality of the application decomposition module 114 and the remote copy restore process selection module 116 may be implemented at least in part in the form of software that is stored in memory and executed by a processor.

Although shown as external to the host devices 102 and storage arrays 106 in the FIG. 1 embodiment, it should be appreciated that the application restore management service 112 in other embodiments may be implemented at least in part internal to one or more of the host devices 102 and/or one or more of the storage arrays 106 (e.g., such as on the storage controllers 110 of storage array 106-1).

The host devices 102, storage arrays 106 and application restore management service 112 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102, the storage arrays 106 and the application restore management service 112 may be implemented on respective distinct processing platforms, although numerous other arrangements are possible. For example, in some embodiments at least portions of one or more of the host devices 102, the storage arrays 106 and the application restore management service 112 are implemented on the same processing platform. The application restore management service 112, one or more of the storage arrays 106, or combinations thereof, can therefore be implemented at least in part within at least one processing platform that implements at least a subset of the host devices 102.

The network 104 may be implemented using multiple networks of different types to interconnect storage system components. For example, the network 104 may comprise a SAN that is a portion of a global computer network such as the Internet, although other types of networks can be part of the SAN, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although in some embodiments certain commands used by the host devices 102 to communicate with the storage arrays 106 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage array 106-1 in the present embodiment is assumed to comprise a persistent memory that is implemented using a flash memory or other type of non-volatile memory of the storage array 106-1. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 108 of the storage array 106-1, although in other embodiments the persistent memory may be implemented as a designated portion or portions of one or more of the storage devices 108. For example, in some embodiments the storage devices 108 may comprise flash-based storage devices, as in embodiments involving all-flash storage arrays, or may be implemented in whole or in part using other types of non-volatile memory.

As mentioned above, communications between the host devices 102 and the storage arrays 106 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 106 in some embodiments may be implemented as part of a cloud-based system.

The storage devices 108 of the storage array 106-1 can be implemented using solid state drives (SSDs). Such SSDs are implemented using non-volatile memory (NVM) devices such as flash memory. Other types of NVM devices that can be used to implement at least a portion of the storage devices 108 include non-volatile random-access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 108.

The storage arrays 106 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage arrays 106 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. The storage arrays 106 and the application restore management service 112 may be implemented at least in part in the first geographic location, the second geographic location, and one or more other geographic locations. Thus, it is possible in some implementations of the system 100 for different ones of the host devices 102, the storage arrays 106 and the application restore management service 112 to reside in different data centers.

Numerous other distributed implementations of the host devices 102, the storage array 106 and the application restore management service 112 are possible. Accordingly, the host devices 102, the storage array 106 and the application restore management service 112 can also be implemented in a distributed manner across multiple data centers.

Additional examples of processing platforms utilized to implement portions of the system 100 in illustrative embodiments will be described in more detail below in conjunction with FIGS. 8 and 9.

It is to be understood that the particular set of elements shown in FIG. 1 for selecting restore processes for applications hosted on storage volumes that are part of group replication sessions is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for selecting restore processes for applications hosted on storage volumes that are part of group replication sessions will now be described in more detail with reference to the flow diagram of FIG. 2. It is to be understood that this particular process is only an example, and that additional or alternative processes for selecting restore processes for applications hosted on storage volumes that are part of group replication sessions may be used in other embodiments.

In this embodiment, the process includes steps 200 through 208. These steps are assumed to be performed by the application restore management service 112 utilizing the production application decomposition module 114 and the remote copy restore process selection module 116. The process begins with step 200, receiving a request to restore one or more applications, the request specifying one of a set of one or more remote copies of one or more storage volumes that stored data of the one or more applications. The one or more applications may comprise at least a subset of a set of applications in an application environment, such as a production application in a production environment.

In step 202, the one or more applications are analyzed to identify (i) the one or more storage volumes storing data for the one or more applications and (ii) one or more groups comprising the identified one or more storage volumes. The one or more groups may comprise at least one of: one or more storage volume groups; one or more storage groups; one or more consistency groups; and one or more NAS servers. Step 202 may comprise decomposing the one or more applications to generate a mapping of each of the one or more applications to the identified one or more storage volumes and associated group information. The mapping for a given one of the one or more applications may map the given application to one or more filesystems and one or more physical devices comprising the identified one or more storage volumes.

The FIG. 2 process continues with step 204, determining whether the identified one or more groups are part of a group replication session. Step 204 may comprise utilizing catalog information of a copy data management (CDM) tool to identify replication session information associated with the identified one or more groups. Responsive to determining that the identified one or more groups are part of the group replication session, one of a set of two or more different types of restore processes is selected in step 206 for performing the restore of the one or more applications to the specified remote copy based at least in part on whether the identified one or more groups comprise one or more additional storage volumes other than the identified one or more storage volumes. The restore of the one or more applications to the specified remote copy is performed in step 208 utilizing the selected restore process.

The two or more different types of restore processes may comprise a first restore process that utilizes volume replication for the identified one or more storage volumes and a second restore process that utilizes group replication for the identified one or more groups. Step 206 may include selecting the first restore process responsive to the identified one or more groups comprising one or more additional storage volumes other than the identified one or more storage volumes, and selecting the second restore process responsive to the identified one or more groups not comprising one or more additional storage volumes other than the identified one or more storage volumes. The first restore process may comprise performing a sync and failover from a source site to a target site, performing volume level restore of the identified one or more storage volumes from the specified remote copy to the target site, and performing a sync and failover from the target site to the source site. The second restore process may comprise performing a failover without sync from a source site to a target site, performing group level restore of the identified one or more storage volumes from the specified remote copy to the target site, and performing a sync and failover from the target site to the source site.

In some embodiments, step 204 further includes determining whether the identified one or more groups are part of one or more dedicated replication sessions, and step 206 includes, responsive to determining that the identified one or more groups are part of the one or more dedicated replication sessions, selecting a third restore process performing the restore of the one or more applications to the specified remote copy that utilizes volume replication for the identified one or more storage volumes. The third restore process that utilizes volume replication for the identified one or more storage volumes may comprise performing a failover without sync from a source site to a target site, performing volume level restore of the identified one or more storage volumes from the specified remote copy to the target site, and performing a sync and failover from the target site to the source site.

An application environment may include multiple applications that are hosted and spread across storage volumes of a group, where the group may comprise a volume group, a storage group, a consistency group, a NAS server, etc. A user that operates the application environment may configure group replication on the entities (e.g., a replication session on a volume group for a Dell EMC PowerStore storage array). Group replication refers to a single replication session replicating the data of a group of storage volumes (e.g., volume group sessions in a PowerStore storage array) or a group of filesystems (e.g., NAS server sessions in a Dell EMC Unity storage array). If the user wants to restore all of the applications hosted on a volume group, the most efficient restore method or process may be different than if the user wants to restore only some of the applications hosted on the volume group. Thus, based on user selection of which applications (e.g., production applications) are to be restored using a copy from a remote site, different restore methods or processes can be used to make the restore most efficient. There is thus a need for a solution to efficiently and optimally roll back data of user-selected applications (e.g., that are part of group replication) using remote copies. Illustrative embodiments meet these and other needs, by analyzing the layout of the user-selected applications to identify and apply a best suited restore method or process for efficiently and optimally rolling back data of user-selected applications using remote copies.

Different types of restore methods or processes may be used to restore production data using remote copies. A method or process for partial restore may be used when the one or more applications selected by the user to be restored fall into partial and distinct sets of volumes of a group. Advantageously, the partial restore method can keep production data for volumes associated with non-selected applications unchanged and intact. A method or process for full restore, which may be used when all (or at least some designated threshold number or proportion) of the applications which are part of a group are selected for restore. Advantageously, the full restore method is more efficient than the partial restore method, as sync of data to a remote location is not required. It should also be appreciated that combinations of the full and partial restore may be required, such as when selected applications are part of multiple groups. For example, a first subset of the selected applications may use all of the volumes of a first volume group and a second subset of the selected applications may use some of the volumes of a second volume group. Thus, a full restore process may be used for the first group and a partial restore process may be used for the third group. Still further, one or more of the selected applications may use one or more volumes that are not part of a group, and thus a full restore of such volumes may be used.

Figure 3A:
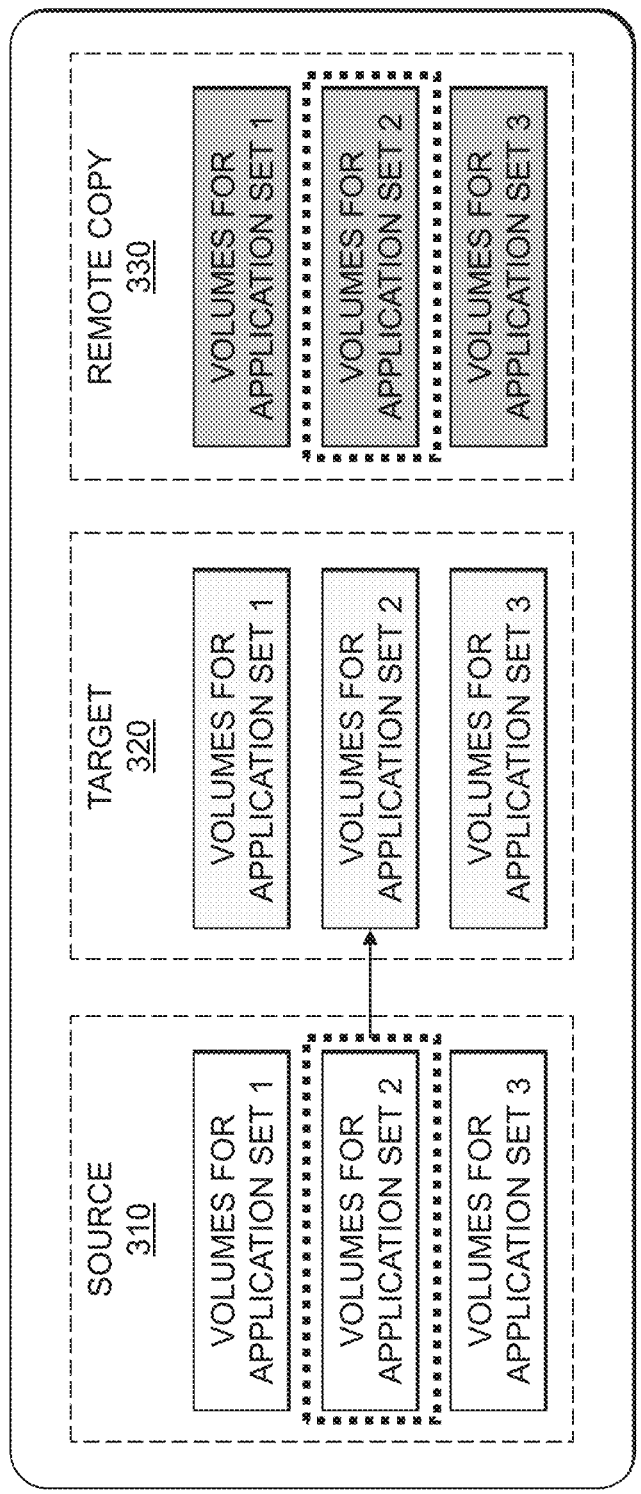
FIGS. 3A-3D show an example of a partial restore process in an illustrative embodiment.

FIGS. 3A-3D illustrate an example of a partial restore method, and show a source 310, a target 320 and a remote copy 330. The source 310 and the target 320 each include storage volumes for different application sets denoted application set 1, application set 2 and application set 3. The source 310 and target 320 may be respective storage arrays that are part of a replication group, with the remote copy 330 including a backup or snapshot of the storage volumes for the application sets 1, 2 and 3. In FIGS. 3A-3D, the different shadings of the volumes for the application sets 1, 2 and 3 indicate that different data may be stored in the volumes for the application sets 1, 2 and 3 in the source 310, target 320 and remote copy 330. FIG. 3A thus illustrates that the source 310, target 320 and remote copy 330 each have different versions of data stored in the volumes for the application sets 1, 2 and 3. For the partial restore example shown in FIGS. 3A-3D, only the volumes for application set 2 are to be rolled back to the version of data stored in the remote copy 330.

Figure 3B:
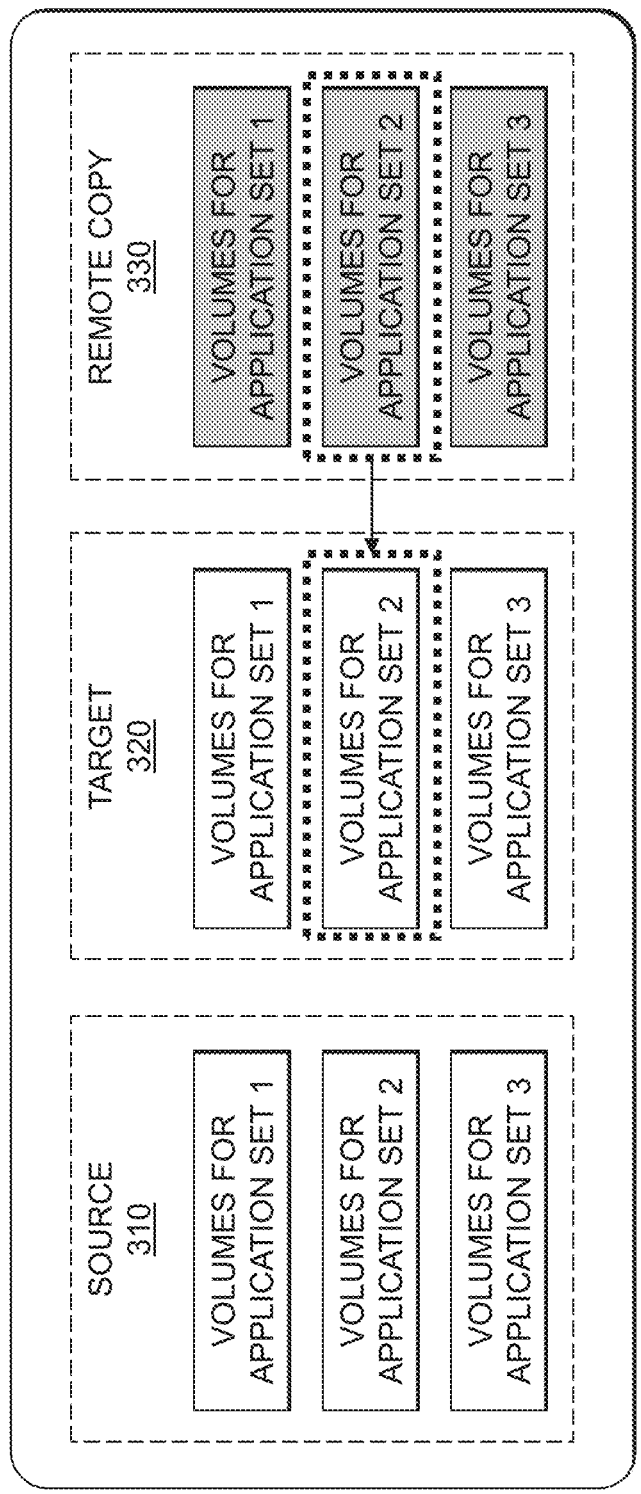
Figure 3C:
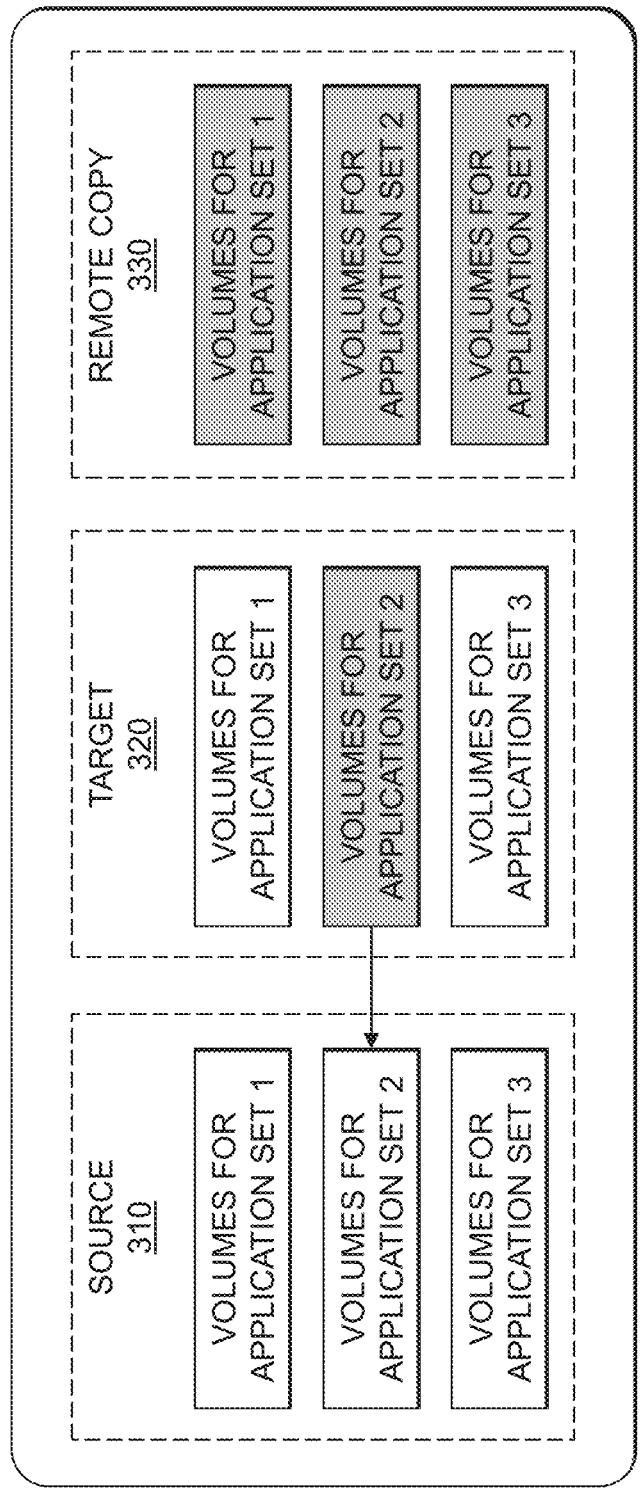
Figure 3D:
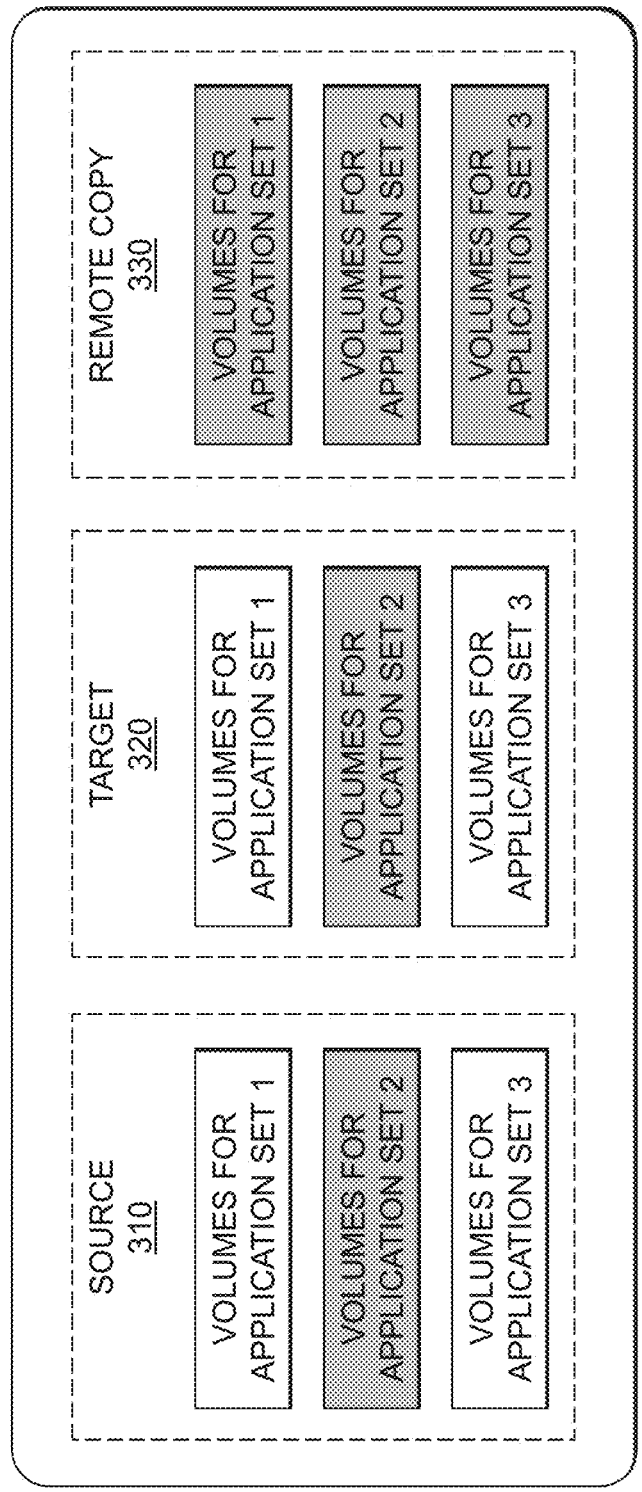

FIG. 3A shows an initial step 301 for the partial restore of volumes for application set 2, where a sync and failover is initiated from the source 310 to the target 320. Following the sync and failover to the target 320, as shown in FIG. 3B, the source 310 and target 320 store the same version of data for the volumes for the application sets 1, 2 and 3. In step 302 shown in FIG. 3B, a volume level restore of the volumes for the application set 2 is performed from the remote copy 330 to the target 320. As shown in FIG. 3C, following the volume level restore for the application set 2, the target 320 stores the same version of data for the application set 2 as the remote copy 330. In step 303 shown in FIG. 3C, a sync and failover from the target 320 to the source 310 is initiated. FIG. 3D shows step 304, where following the sync and failover from the target 320 to the source 310, the source 310 stores the same version of data for the application set 2 as the target 320 (e.g., the data rolled back from the remote copy 330).

Figure 4A:
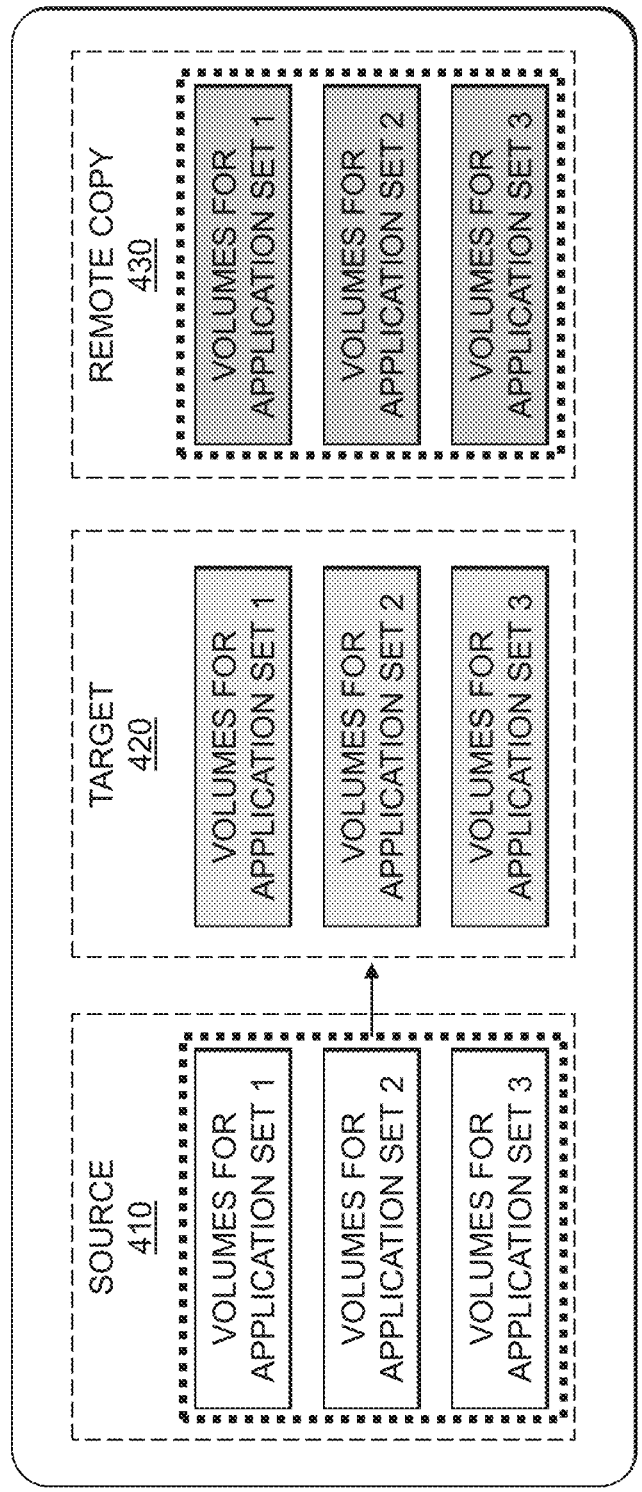
FIGS. 4A-4D show an example of a full restore process in an illustrative embodiment.
Figure 4B:
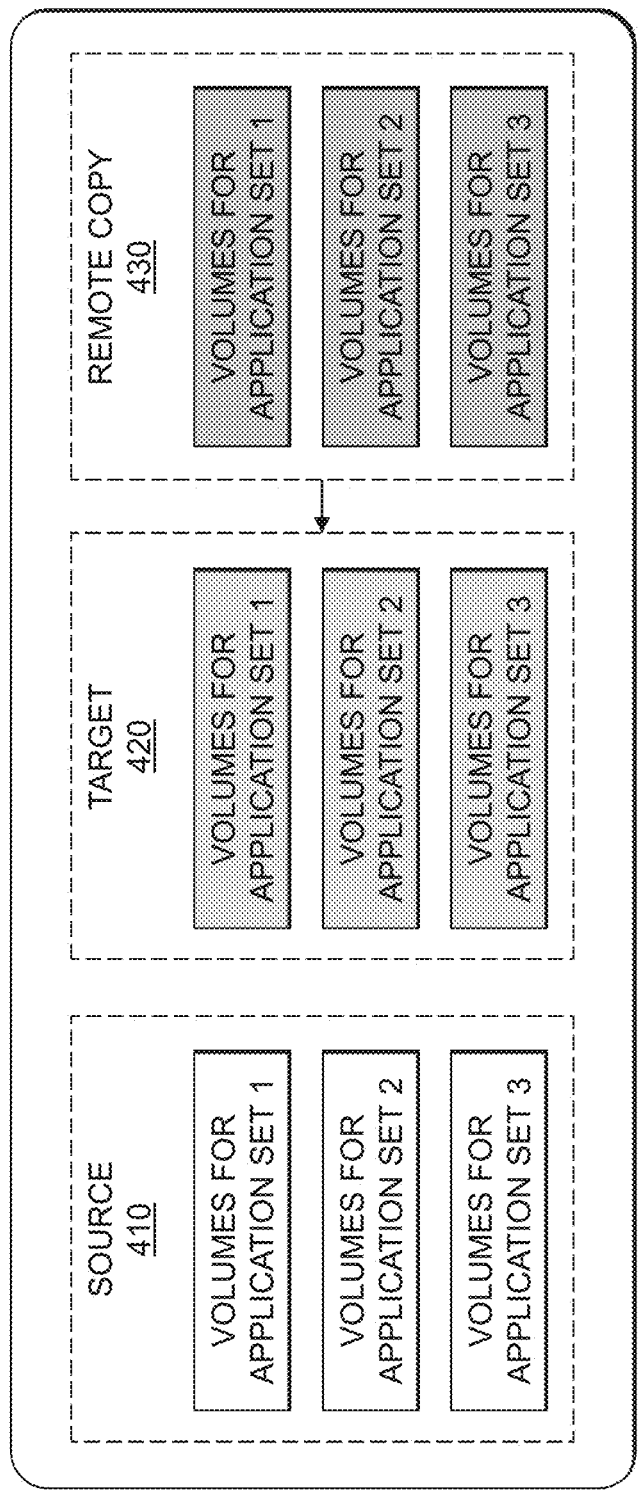

FIGS. 4A-4D illustrate an example of a full restore method, and similar to FIGS. 3A-3D show a source 410, a target 420 and a remote copy 430. The source 410 and the target 420 each include storage volumes for application sets 1, 2 and 3. The source 410 and target 420 may be respective storage arrays that are part of a replication group, with the remote copy 430 including a backup or snapshot of the storage volumes for the application sets 1, 2 and 3. Again similar to FIGS. 3A-3D, in FIGS. 4A-4D the different shadings of the volumes for the application sets 1, 2 and 3 represent different versions of data stored in the volumes for the application sets 1, 2 and 3. FIG. 4A thus illustrates that the source 410, target 420 and remote copy 430 each have different versions of data stored in the volumes for the application sets 1, 2 and 3. For the full restore example shown in FIGS. 4A-4D, all of the volumes for application sets 1, 2 and 3 are to be rolled back to the data stored in the remote copy 430.

Figure 4C:
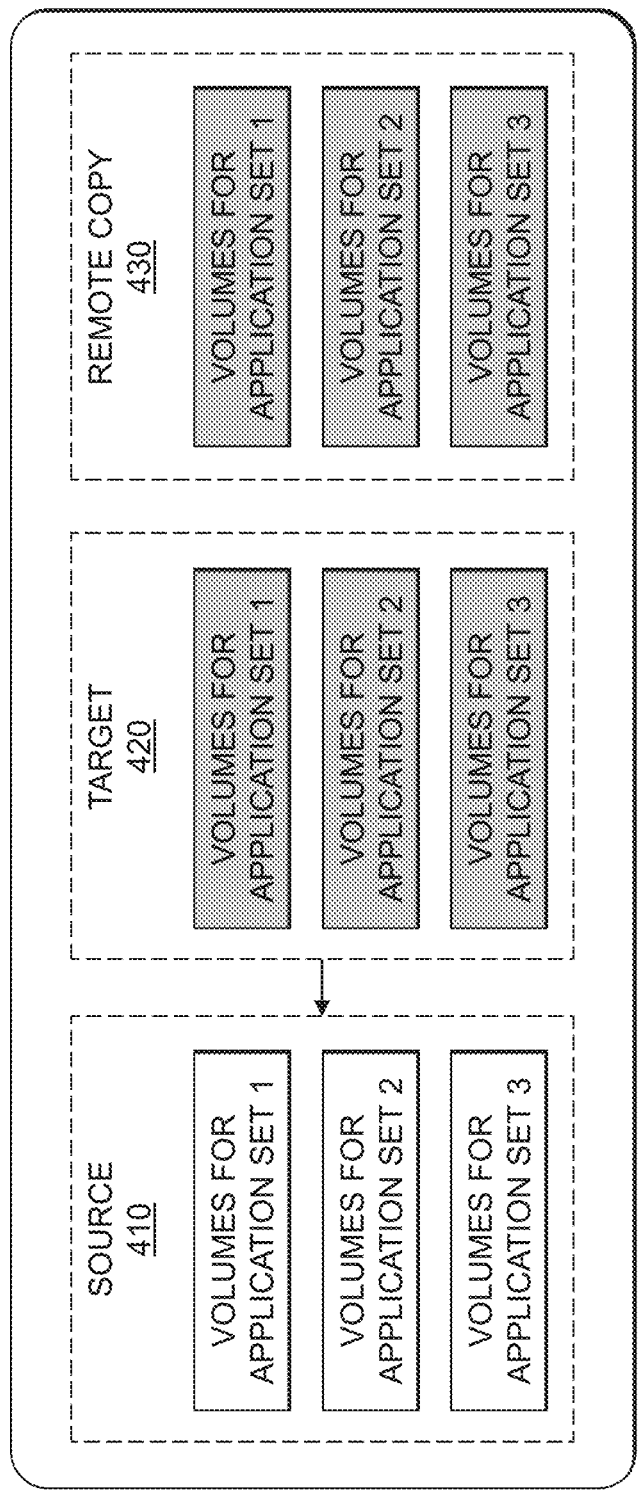
Figure 4D:
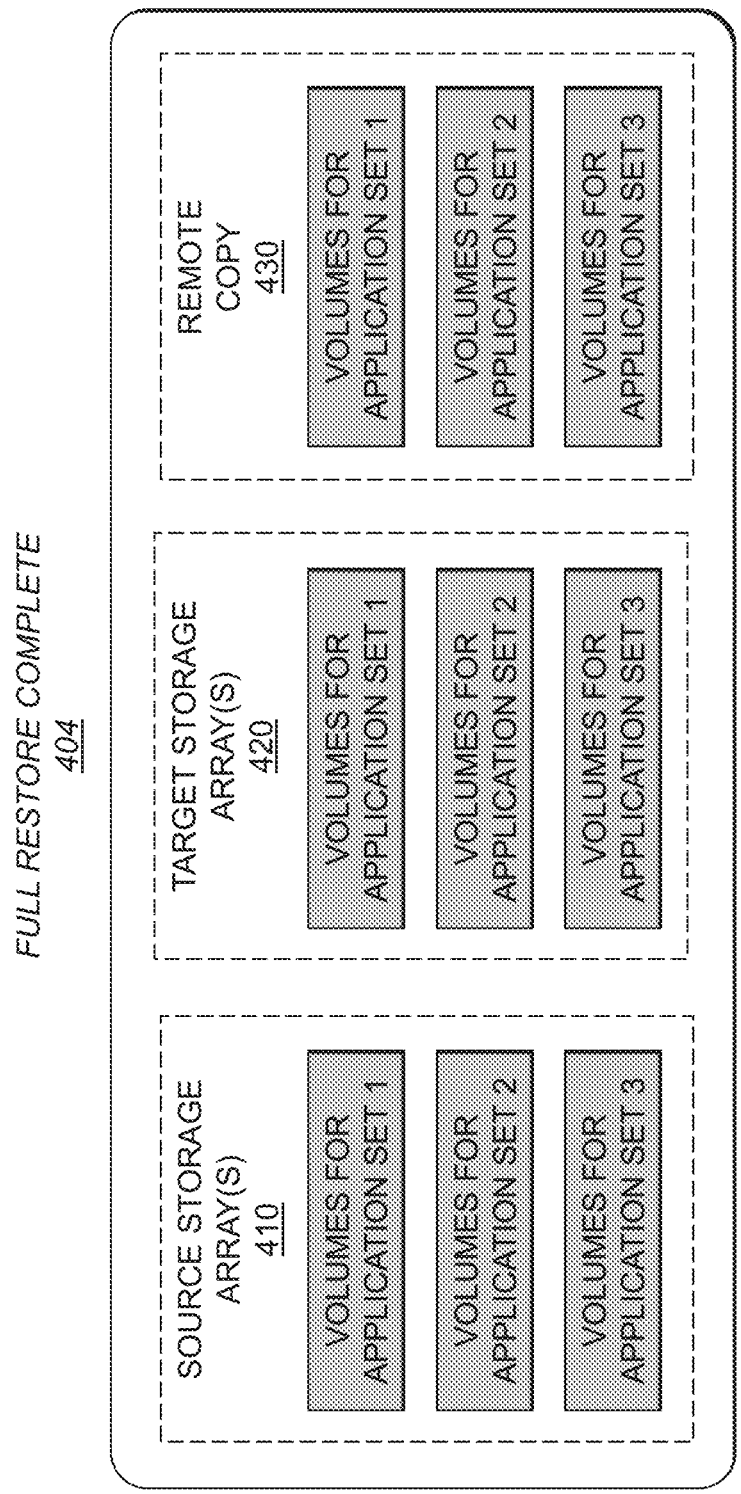

FIG. 4A shows an initial step 401 for the full restore of volumes for the application sets 1, 2 and 3, where a failover without sync is initiated from the source 410 to the target 420. While the partial restore method illustrated in FIGS. 3A-3D started in step 301 with sync and failover (as the application sets 1 and 3 are not being rolled back), the full restore method illustrated in FIGS. 4A-4D does not require sync in step 401 as all of the application sets 1, 2 and 3 are being rolled back to the remote copy 430. Following the failover without sync to the target 420, a group level restore is performed from the remote copy 430 to the target 420 (step 402 in FIG. 4B). While the partial restore method illustrated in FIGS. 3A-3D in step 302 performed a volume level restore for only the volumes for application set 2, the full restore method illustrated in FIGS. 4A-4D uses a group level restore as all of the volumes in the group (e.g., volumes for application sets 1, 2 and 3) are being rolled back. As shown in FIG. 4C, following the group level restore, the target 420 stores the same version of data for the application sets 1, 2 and 3 as the remote copy 430. In step 403 shown in FIG. 4C, a sync and failover from the target 420 to the source 410 is initiated. FIG. 4D shows step 404, where following the sync and failover from the target 420 to the source 410, the source 410 stores the same version of data for the application sets 1, 2 and 3 as the target 420 (e.g., the data rolled back from the remote copy 430).

Figure 5:
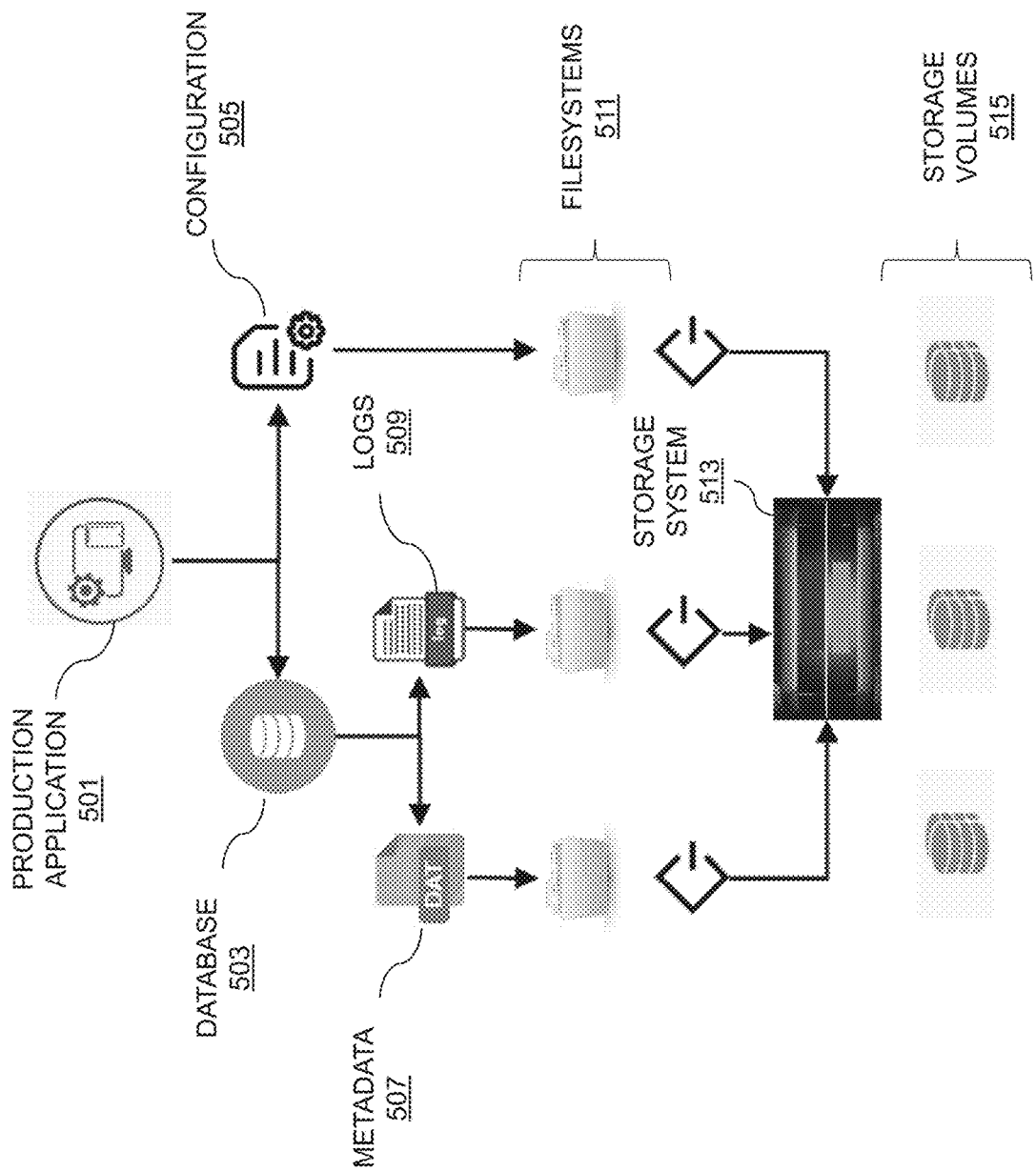
FIG. 5 shows an architecture of an application workload running on a host storage system in an illustrative embodiment.

A solution may involve developing new CDM tools, or modifying existing CDM tools (e.g., Dell EMC AppSync™) to provide the functionality described herein. The CDM tools are configured with the capability to decompose a production application instance and generate a complete mapping information of the lowest level storage volume information. For example, the CDM tools may be configured to convert an application or database instance information to the host filesystem→host volume group→host physical device→hypervisor filesystem→hypervisor physical device→storage system volume (LUN) and consistency group information. FIG. 5 shows an example architecture, including a production application 501, a database 503 and configuration 505, metadata 507 and logs 509, multiple filesystems 511, a storage system 513 and storage volumes 515. The CDM tools are further utilized to catalog application copies with the decomposed application layout information, along with corresponding snapshot information (e.g., remote copy information).

Figure 6:
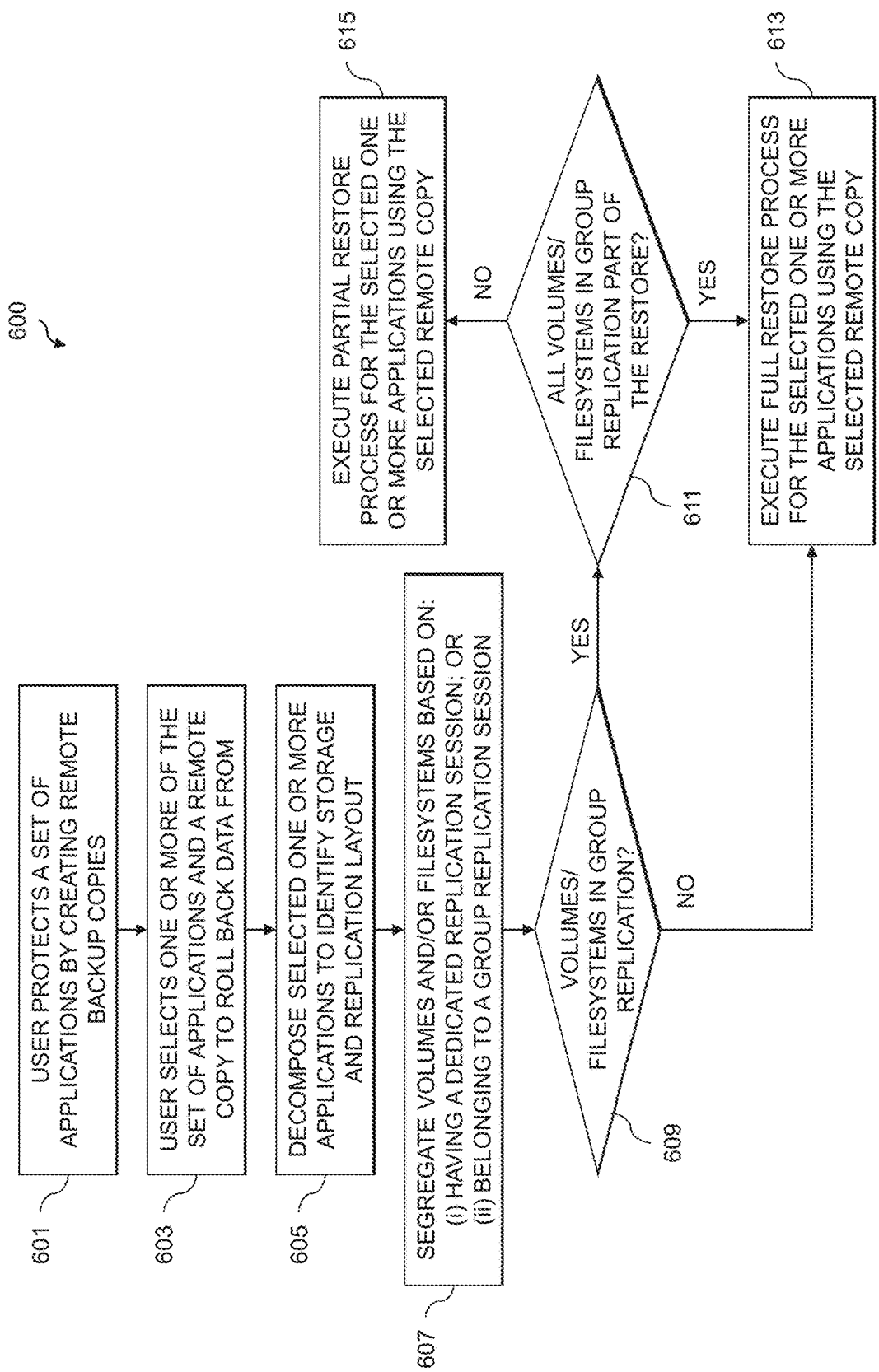
FIG. 6 shows a process flow for selecting a remote copy restore process for one or more of a set of applications in an illustrative embodiment.

FIG. 6 shows a process flow 600 for selecting a restore method or process for rolling back data from remote array snapshots. In step 601, a user protects a set of applications by creating remote backup copies. In step 603, the user selects one or more of the set of applications and a remote copy to roll back data from. In step 605, a CDM tool is used to decompose the selected one or more applications to identify their underlying storage volumes (or filesystems) and associated volume (or filesystem) groups, as well as their replication sessions using its catalog information, also referred to as a storage and replication layout of the selected one or more applications. Below, such information may be referred to as the decomposed volumes and volume groups. In step 607, the decomposed volumes and volume groups are analyzed, to segregate the volumes and/or filesystems based on whether they (i) have a dedicated replication session or (ii) belong to a group replication session.

In step 609, a determination is made as to whether the volumes or filesystems are part of or belong to a group replication session. If the result of the step 609 determination is yes, then the process 600 proceeds to step 611 where a determination is made as to whether all the volumes or filesystems in the group replication session are part of the restore operation (e.g., whether all of the volumes or filesystems in the group replication session are part of the decomposed volumes and volume groups for the user-selected one or more applications in step 603). If the result of the step 611 determination is yes, or the result of the step 609 determination is no, the process 600 proceeds to step 613 where a full restore process is executed for the one or more applications using the remote copy selected in step 603. If the result of the step 611 determination is no, the process 600 proceeds to step 615 where a partial restore process is executed for the one or more applications using the remote copy selected in step 603.

Figure 7A:
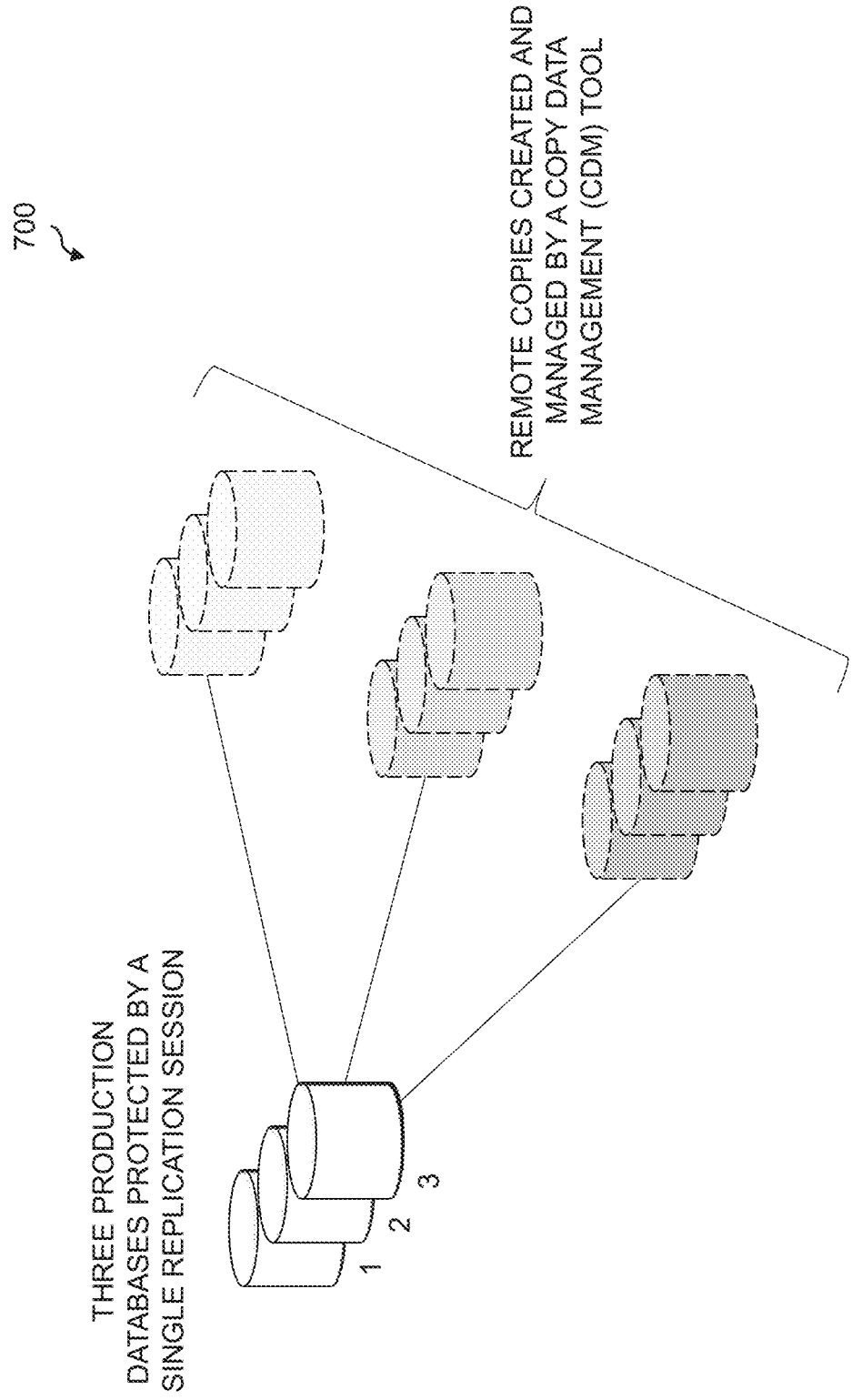
FIGS. 7A and 7B show examples of a set of applications with remote copies and a selection of one or more of the set of applications and a remote copy to roll back data from in an illustrative embodiment.
Figure 7B:
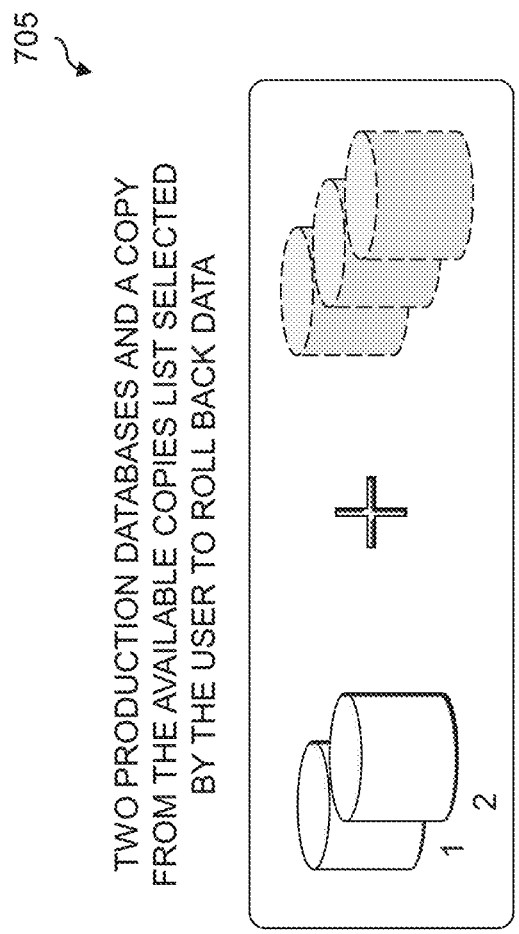

FIG. 7A illustrates an example 700 of step 601 in the process 600, where the protected set of applications includes three production databases in a single replication session. The example 700 also shows remote copies of the three production databases that are created and managed by a CDM tool. FIG. 7B illustrates an example 705 of step 603 in the process 600, where the user selects two of the production databases to roll back from one of the remote copies shown in example 700. In this example, as the selected set of applications includes only two of the three production databases protected by the single group replication session, a partial restore will be executed in step 615 of the process 600.

More generally, if the decomposed volume groups from step 605 contain only the decomposed volumes, then the CDM tool will deploy and execute a full restore method using the group replication session. FIGS. 4A-4D, described above, illustrate an example of the full restore method. If the decomposed volumes group from step 605 contain one or more additional volumes other than the decomposed volumes, then the CDM tool will deploy and execute the partial restore method using the group replication session. If the decomposed volumes are not part of any volume group (e.g., the decomposed volumes exist as individual entities each having a dedicated replication session), then the CDM tool will deploy and execute the full restore method using volume replication for such volumes.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for selecting restore processes for applications hosted on storage volumes that are part of group replication sessions will now be described in greater detail with reference to FIGS. 8 and 9. Although described in the context of system 100, these platforms may also be used to implement at least portions of other information processing systems in other embodiments.

Figure 8:
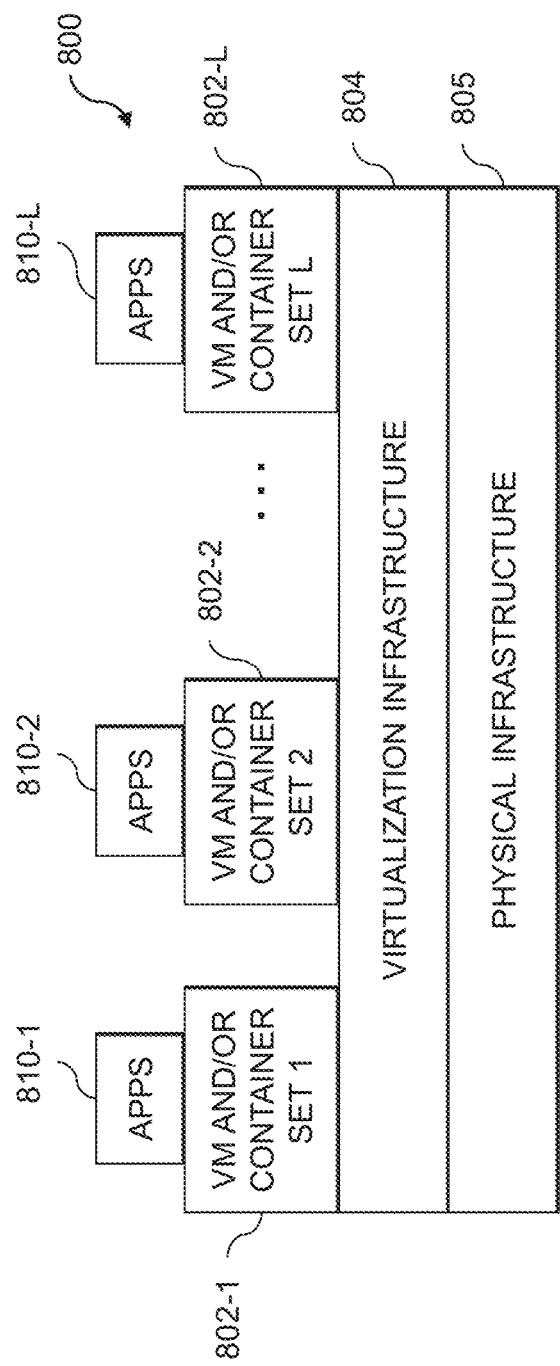
FIGS. 8 and 9 show examples of processing platforms that may be utilized to implement at least a portion of an information processing system in illustrative embodiments.
Figure 9:
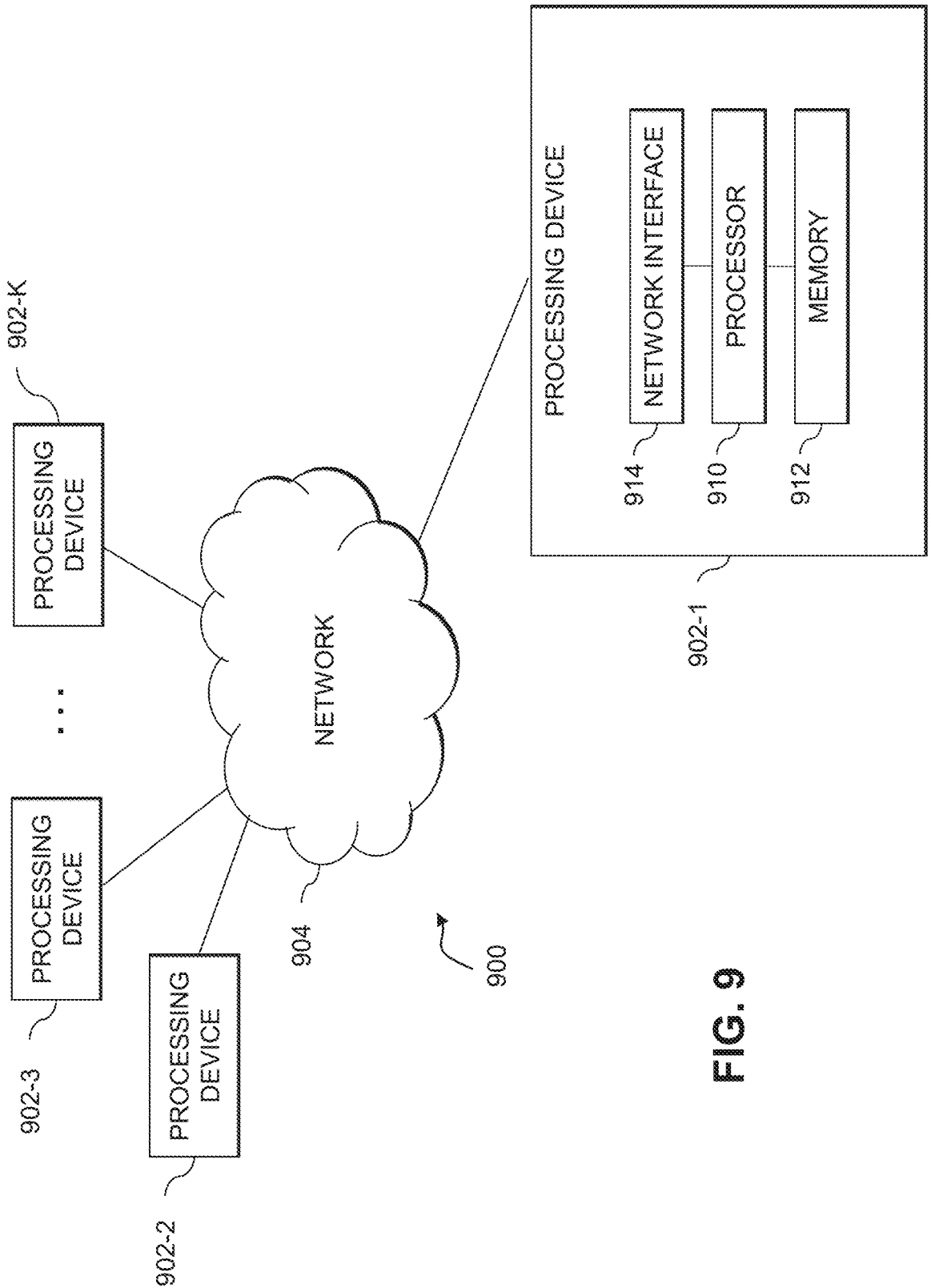

FIG. 8 shows an example processing platform comprising cloud infrastructure 800. The cloud infrastructure 800 comprises a combination of physical and virtual processing resources that may be utilized to implement at least a portion of the information processing system 100 in FIG. 1. The cloud infrastructure 800 comprises multiple virtual machines (VMs) and/or container sets 802-1, 802-2, . . . 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system.

The cloud infrastructure 800 further comprises sets of applications 810-1, 810-2, . . . 810-L running on respective ones of the VMs/container sets 802-1, 802-2, . . . 802-L under the control of the virtualization infrastructure 804. The VMs/container sets 802 may comprise respective VMs, respective sets of one or more containers, or respective sets of one or more containers running in VMs.

In some implementations of the FIG. 8 embodiment, the VMs/container sets 802 comprise respective VMs implemented using virtualization infrastructure 804 that comprises at least one hypervisor. A hypervisor platform may be used to implement a hypervisor within the virtualization infrastructure 804, where the hypervisor platform has an associated virtual infrastructure management system. The underlying physical machines may comprise one or more distributed processing platforms that include one or more storage systems.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises a portion of system 100 and includes a plurality of processing devices, denoted 902-1, 902-2, 902-3, . . . 902-K, which communicate with one another over a network 904.

The network 904 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 902-1 in the processing platform 900 comprises a processor 910 coupled to a memory 912.

The processor 910 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 912 may comprise random access memory (RAM), read-only memory (ROM), flash memory or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for selecting restore processes for applications hosted on storage volumes that are part of group replication sessions as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, storage groups, restore processes, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured to perform steps of:
   receiving a request to restore one or more applications, the request specifying one of a set of one or more remote copies of one or more storage volumes that store data of the one or more applications;
   analyzing the one or more applications to identify (i) the one or more storage volumes storing data for the one or more applications and (ii) one or more groups comprising the identified one or more storage volumes;
   determining whether the identified one or more groups are part of a group replication session;

responsive to determining that the identified one or more groups are part of the group replication session, selecting one of a set of two or more different types of restore processes for performing the restore of the one or more applications to the specified remote copy based at least in part on whether the identified one or more groups comprise one or more additional storage volumes other than the identified one or more storage volumes; and performing the restore of the one or more applications to the specified remote copy utilizing the selected restore process;

wherein the two or more different types of restore processes comprise at least one restore process that utilizes group replication and at least one restore process that utilizes non-group replication.

2. The apparatus of claim 1 wherein the one or more applications comprise at least a subset of a set of applications in an application environment.

3. The apparatus of claim 2 wherein the application environment comprises a production environment, and the set of applications comprise production applications in the production environment.

4. The apparatus of claim 1 wherein the one or more groups comprise at least one of:
one or more storage volume groups;
one or more storage groups;
one or more consistency groups; and
one or more network attached storage (NAS) servers.

5. The apparatus of claim 1 wherein analyzing the one or more applications comprises decomposing the one or more applications to generate a mapping of each of the one or more applications to the identified one or more storage volumes and associated group information.

6. The apparatus of claim 5 wherein the mapping for a given one of the one or more applications maps the given application to one or more filesystems and one or more physical devices comprising the identified one or more storage volumes.

7. The apparatus of claim 1 wherein determining whether the identified one or more groups are part of the group replication session comprises utilizing catalog information of a copy data management tool to identify replication session information associated with the identified one or more groups.

8. An apparatus comprising:
at least one processing device comprising a processor coupled to a memory;
the at least one processing device being configured to perform steps of:
receiving a request to restore one or more applications, the request specifying one of a set of one or more remote copies of one or more storage volumes that store data of the one or more applications;
analyzing the one or more applications to identify (i) the one or more storage volumes storing data for the one or more applications and (ii) one or more groups comprising the identified one or more storage volumes;
determining whether the identified one or more groups are part of a group replication session;
responsive to determining that the identified one or more groups are part of the group replication session, selecting one of a set of two or more different types of restore processes for performing the restore of the one or more applications to the specified remote copy based at least in part on whether the identified one or more groups comprise one or more additional storage volumes other than the identified one or more storage volumes; and performing the restore of the one or more applications to the specified remote copy utilizing the selected restore process;

wherein the two or more different types of restore processes comprise:
a first restore process that utilizes volume replication for the identified one or more storage volumes; and
a second restore process that utilizes group replication for the identified one or more groups.

9. The apparatus of claim 8 wherein selecting one of the set of two or more different types of restore processes for performing the restore of the one or more applications to the specified remote copy comprises selecting the first restore process responsive to the identified one or more groups comprising one or more additional storage volumes other than the identified one or more storage volumes.

10. The apparatus of claim 8 wherein selecting one of the set of two or more different types of restore processes for performing the restore of the one or more applications to the specified remote copy comprises selecting the second restore process responsive to the identified one or more groups not comprising one or more additional storage volumes other than the identified one or more storage volumes.

11. The apparatus of claim 8 wherein the first restore process comprises:
performing a sync and failover from a source site to a target site;
performing volume level restore of the identified one or more storage volumes from the specified remote copy to the target site; and
performing a sync and failover from the target site to the source site.

12. The apparatus of claim 8 wherein the second restore process comprises:
performing a failover without sync from a source site to a target site;
performing group level restore of the identified one or more storage volumes from the specified remote copy to the target site; and
performing a sync and failover from the target site to the source site.

13. The apparatus of claim 8 wherein the at least one processing device is further configured to perform the step of determining whether the identified one or more groups are part of one or more dedicated replication sessions.

14. The apparatus of claim 13 wherein the at least one processing device is further configured to perform the step of, responsive to determining that the identified one or more groups are part of the one or more dedicated replication sessions, selecting one of the set of two or more different types of restore processes for performing the restore of the one or more applications to the specified remote copy that utilizes volume replication for the identified one or more storage volumes.

15. A computer program product comprising a non-transitory processor-readable storage medium having stored therein program code of one or more software programs, wherein the program code when executed by at least one processing device causes the at least one processing device to perform steps of:
receiving a request to restore one or more applications, the request specifying one of a set of one or more remote copies of one or more storage volumes that store data of the one or more applications;

analyzing the one or more applications to identify (i) the one or more storage volumes storing data for the one or more applications and (ii) one or more groups comprising the identified one or more storage volumes;

determining whether the identified one or more groups are part of a group replication session;

responsive to determining that the identified one or more groups are part of the group replication session, selecting one of a set of two or more different types of restore processes for performing the restore of the one or more applications to the specified remote copy based at least in part on whether the identified one or more groups comprise one or more additional storage volumes other than the identified one or more storage volumes; and performing the restore of the one or more applications to the specified remote copy utilizing the selected restore process;

wherein the two or more different types of restore processes comprise at least one restore process that utilizes group replication and at least one restore process that utilizes non-group replication.

16. The computer program product of claim 15 wherein the two or more different types of restore processes comprise:
   a first restore process that utilizes volume replication for the identified one or more storage volumes; and
   a second restore process that utilizes group replication for the identified one or more groups.

17. The computer program product of claim 16 wherein selecting one of the set of two or more different types of restore processes for performing the restore of the one or more applications to the specified remote copy comprises:
   selecting the first restore process responsive to the identified one or more groups comprising one or more additional storage volumes other than the identified one or more storage volumes; and
   selecting the second restore process responsive to the identified one or more groups not comprising one or more additional storage volumes other than the identified one or more storage volumes.

18. A method comprising:
   receiving a request to restore one or more applications, the request specifying one of a set of one or more remote copies of one or more storage volumes that store data of the one or more applications;
   analyzing the one or more applications to identify (i) the one or more storage volumes storing data for the one or more applications and (ii) one or more groups comprising the identified one or more storage volumes;
   determining whether the identified one or more groups are part of a group replication session;
   responsive to determining that the identified one or more groups are part of the group replication session, selecting one of a set of two or more different types of restore processes for performing the restore of the one or more applications to the specified remote copy based at least in part on whether the identified one or more groups comprise one or more additional storage volumes other than the identified one or more storage volumes; and
   performing the restore of the one or more applications to the specified remote copy utilizing the selected restore process;
   wherein the two or more different types of restore processes comprise at least one restore process that utilizes group replication and at least one restore process that utilizes non-group replication; and
   wherein the method is performed by at least one processing device comprising a processor coupled to a memory.

19. The method of claim 18 wherein the two or more different types of restore processes comprise:
   a first restore process that utilizes volume replication for the identified one or more storage volumes; and
   a second restore process that utilizes group replication for the identified one or more groups.

20. The method of claim 19 wherein selecting one of the set of two or more different types of restore processes for performing the restore of the one or more applications to the specified remote copy comprises:
   selecting the first restore process responsive to the identified one or more groups comprising one or more additional storage volumes other than the identified one or more storage volumes; and
   selecting the second restore process responsive to the identified one or more groups not comprising one or more additional storage volumes other than the identified one or more storage volumes.

21. The method of claim 18 wherein determining whether the identified one or more groups are part of the group replication session comprises utilizing catalog information of a copy data management tool to identify replication session information associated with the identified one or more groups.

* * * * *